(12) United States Patent
Tanaka et al.

(10) Patent No.: US 7,963,552 B2
(45) Date of Patent: Jun. 21, 2011

(54) HEAD-PROTECTING AIRBAG (75) Inventors: Motoyuki Tanaka, Aichi-ken (JP);
Yoshio Mizuno, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 173 days.

(21) Appl. No.: 12/382,581

(22) Filed: Mar. 19, 2009

(65) Prior Publication Data

US 2009/0236833 A1 Sep. 24, 2009

(30) Foreign Application Priority Data

Mar. 24, 2008 (JP) ................................. 2008-076460

(51) Int. Cl.
*B60R 21/214* (2006.01)
*B60R 21/26* (2011.01)

(52) U.S. Cl. ....................... 280/730.2; 280/736; 280/742

(58) Field of Classification Search ............... 280/730.2, 280/736, 743.1, 742, 740
See application file for complete search history.

(56) References Cited

U.S. PATENT DOCUMENTS

| | | | |
|---|---|---|---|
| 7,322,600 B2* | 1/2008 | Inoue et al. | 280/730.2 |
| 7,766,378 B2* | 8/2010 | Miura et al. | 280/730.2 |
| 7,775,553 B2* | 8/2010 | Takemura et al. | 280/730.2 |
| 2002/0036394 A1* | 3/2002 | Bakhsh et al. | 280/730.2 |
| 2002/0036395 A1* | 3/2002 | Bakhsh et al. | 280/730.2 |
| 2004/0130128 A1* | 7/2004 | Bakhsh et al. | 280/730.2 |
| 2006/0017267 A1* | 1/2006 | Fink | 280/730.2 |
| 2006/0208466 A1* | 9/2006 | Kirby | 280/730.2 |
| 2007/0138778 A1* | 6/2007 | Takemura et al. | 280/743.1 |
| 2008/0030011 A1* | 2/2008 | Ishikawa et al. | 280/730.2 |
| 2008/0169631 A1* | 7/2008 | Hill | 280/743.1 |
| 2008/0284145 A1* | 11/2008 | Breed | 280/736 |
| 2008/0309056 A1* | 12/2008 | Ohba | 280/730.2 |
| 2009/0026742 A1* | 1/2009 | Noguchi et al. | 280/730.2 |
| 2009/0230659 A1* | 9/2009 | Megiveron et al. | 280/728.3 |
| 2009/0243267 A1* | 10/2009 | Fletcher et al. | 280/730.2 |
| 2010/0025971 A1* | 2/2010 | Steinbach et al. | 280/729 |
| 2010/0084841 A1* | 4/2010 | Suemitsu et al. | 280/730.2 |
| 2010/0133795 A1* | 6/2010 | Fukuda et al. | 280/730.2 |
| 2010/0140909 A1* | 6/2010 | Jang | 280/743.1 |
| 2010/0164205 A1* | 7/2010 | Yamamura et al. | 280/730.2 |
| 2010/0207367 A1* | 8/2010 | Weyrich et al. | 280/730.2 |
| 2010/0244415 A1* | 9/2010 | Wipasuramonton et al. | 280/730.2 |
| 2010/0270781 A1* | 10/2010 | Abney et al. | 280/730.2 |

FOREIGN PATENT DOCUMENTS

| | | |
|---|---|---|
| JP | A-2004-034766 | 2/2004 |
| JP | A-2007-161167 | 6/2007 |

* cited by examiner

*Primary Examiner* — Ruth Ilan
*Assistant Examiner* — Karen A Beck
(74) *Attorney, Agent, or Firm* — Posz Law Group, PLC (57) ABSTRACT

A head-protecting airbag is deployable downward from an upper periphery of a window of vehicle to cover the window. The airbag includes a primary inflatable portion that includes a protection portion for receiving an occupant's head and a secondary inflatable portion that admits inflation gas of the primary inflatable portion and is inflatable secondarily for preventing a pressure increase of the primary inflatable portion. The primary inflatable portion and the secondary inflatable portion are communicated with a tubular conduit that is arranged along the lower periphery of the airbag. The protection portion includes an inlet-side inflatable portion communicated with the conduit and an upper inflatable portion located above the conduit. The conduit includes a main region located facing the outlet port and an enlarged-diameter region that is located facing the inlet port and has a greater opening dimension than the main region.

10 Claims, 11 Drawing Sheets

HEAD-PROTECTING AIRBAG

The present application claims priority from Japanese Patent Application No. 2008-076460 of Tanaka et al., filed on Mar. 24, 2008, the disclosure of which is hereby incorporated into the present application by reference.

BACKGROUND OF THE INVENTION

1. Field of the Invention

The present invention relates to a head-protecting airbag housed in an upper periphery of a window (or side window) inside of a vehicle for deployment downward to protect a head of an occupant.

2. Description of Related Art

In the prior art, JP 2004-034766 A and JP 2007-161167 A are illustrative of conventional head-protecting airbags. Each of these airbags includes a gas admissive portion that is inflatable with inflation gas by separating an inner panel and an outer panel and a non-admissive portion that admits no inflation gas and keeps the inner panel and outer panel attached together. The gas admissive portion includes a primary inflatable portion that inflates in an early stage of airbag deployment and a secondary inflatable portion (also called a sub chamber or sub inflatable portion) communicated with the primary inflatable portion. The primary inflatable portion includes a protection portion for receiving a head of an occupant and, the protection portion and the secondary inflatable portion are communicated with each other by a conduit (also called a vent hole or constricted portion) that is tubular in shape. The secondary inflatable portion is provided to absorb inflation gas from the protection portion of the primary inflatable portion at the pressure increase of the protection portion in order to reduce a reaction force of the protection portion which may otherwise be applied to the occupant's head when the protection portion receives the head. The conduit includes an inlet at a side of the protection portion and an outlet to the secondary inflatable portion, and is located proximate the lower periphery of the airbag. In order that the inflation gas is fed to the secondary inflatable portion after the protection portion completes inflation, not immediately, the conduit has a length of a certain degree and a restrained opening dimension in a direction orthogonal to the axial direction from the inlet to the outlet to some extent.

However, at deployment of such conventional airbags, the primary inflatable portion unfurls and inflates downward with the secondary inflatable portion kept uninflated, and then the lower periphery of the airbag tends to move upward as a reaction to the downward deployment. That is, immediately after the completion of inflation of the primary inflatable portion, the secondary inflatable portion as well as the conduit located proximate the lower periphery of the airbag are likely to bend upward and cave in since they are not inflated.

These events may cause a bend of, i.e. occlusion of the conduit. If the occupant's head hits the protection portion and increases the inner pressure of the protection portion with the conduit occluded, the inflation gas inside the protection portion is not fed to the secondary inflatable portion, such that the protection portion cannot avoid the increase of internal pressure.

SUMMARY OF THE INVENTION

The present invention contemplates to solve the above-described problems, and therefore, has an object to provide a head-protecting airbag that can prevent an occlusion of the conduit right after the completion of inflation of the primary inflatable portion and thus avoid an increase of internal pressure of the protection portion in a steady fashion.

The head-protecting airbag of the invention is mountable on an upper periphery of a window of a vehicle inside the vehicle for deployment downward to cover the window. The airbag includes a gas admissive portion inflatable with inflation gas by separating an inner panel and an outer panel and a non-admissive portion that admits no inflation gas and keeps the inner panel and outer panel attached together.

The gas admissive portion includes a primary inflatable portion inflatable in an early stage of airbag deployment and a secondary inflatable portion that admits inflation gas from the protection portion for restraining a pressure increase of the protection portion. The primary inflatable portion includes a protection portion that receives and protects a head of an occupant and a conduit that is tubular in shape and communicates the protection portion and the secondary inflatable portion.

The non-admissive portion includes a peripheral portion located on an outer periphery of the gas admissive portion and a partitioning portion that defines boundaries of the secondary inflatable portion and the conduit. The partitioning portion includes an upper boundary portion that extends from a periphery of the secondary inflatable portion and defines an upper boundary of the conduit.

The conduit extends along an anteroposterior direction of the airbag and adjacent a bottom area of the peripheral portion in a lower periphery of the airbag from an inlet port from the protection portion to an outlet port to the secondary inflatable portion. The conduit includes a main region that is located on a side of the outlet port and an enlarged-diameter region that is located on a side of the inlet port and extends straightly. The enlarged-diameter region has an opening dimension in a vertical direction greater than that of the main region, and the opening dimension in a vertical direction is equal to or greater than a length in an anteroposterior direction thereof.

The protection portion includes an inlet-side inflatable portion adjoining the inlet port of the conduit in an anteroposterior direction and an upper inflatable portion that is located above the conduit and partitioned from the conduit by the upper boundary portion. The inlet-side inflatable portion includes an opposing region that is located to oppose and communicated with the inlet port of the conduit and an upper extending region that extends upward from the opposing region up to a higher level relative to the inlet port of the conduit. The upper inflatable portion is communicated with the upper extending region of the inlet-side inflatable portion so as to be inflatable generally simultaneously with the inlet-side inflatable portion upon inflation of the primary inflatable portion and has an opening dimension in a vertical direction that is greater than that of the enlarged-diameter region.

In operation of the airbag of the invention, the primary inflatable portion completes deployment firstly and covers interiors of the window. At this time, in an area surrounding the conduit, the inlet-side inflatable portion, the upper inflatable portion and the enlarged-diameter region of the conduit communicated with one another inflate in an integrated manner. Specifically, the enlarged-diameter region of the conduit and the inlet-side inflatable portion inflate together generally in a L-shape and exert such a rigidity or shape retention characteristic as to prevent an occlusion of the main region of the conduit at the rebound of the lower periphery of the airbag immediately after the completion of the deployment of the primary inflatable portion. The upper inflatable portion is communicated with the upper extension portion of the inlet-side inflatable portion and thus inflates together with the enlarged-diameter region as well. Coupled with its opening dimension in a vertical direction greater than that of the enlarged-diameter region, the upper inflatable portion at inflation also exerts such a shape retention characteristic as to support the enlarged-diameter region, i.e. prevent the enlarged-diameter region from tilting or moving upward.

Accordingly, even in the event that the lower periphery of the airbag attempts to move upward as a reaction to the downward deployment of the primary inflatable portion while the secondary inflatable portion is not yet inflated, the L-shaped inflated region constituted of the inlet-side inflatable portion and enlarged-diameter region resists such movement and further the upper inflatable portion also supports the enlarged-diameter region in such a manner as to restrain an upward displacement of the enlarged-diameter region. Accordingly the lower periphery of the airbag in the vicinity of the main region of the conduit is prevented from moving upward, in other words from collapsing or bending to occlusion, thus securing a communication from the inlet port to the outlet port of the conduit.

Thereafter, when the protection portion receives an occupant's head and an inner pressure of the protection portion is going to rise, the inflation gas inside the protection portion smoothly flows into the secondary inflatable portion via an unoccluded, open passage of the conduit, and thus restraining a pressure increase of the protection portion in a stable manner.

Therefore, the airbag of the invention can prevent an occlusion of the conduit and an increase of internal pressure of the protection portion that may be caused by the occlusion right after the completion of inflation of the primary inflatable portion.

In the airbag of the invention, although the opening dimension in a vertical direction of the enlarged-diameter region is greater than that of the main region of the conduit, the opening dimension is equal to or greater than the length thereof in an anteroposterior direction. This configuration sufficiently restrains an outflow of inflation gas from the protection portion into the secondary inflatable portion during the inflation of the primary inflatable portion, and thus expediting the deployment of the primary inflatable portion. Accordingly, when the protection portion receives an occupant's head immediately after completion of the deployment of the primary inflatable portion, it is capable of catching the head in a cushioning manner with the internal pressured suppressed, coupled with the smooth exhaust of inflation gas into the secondary inflatable portion.

Dimensions referred to in this specification such as the length in an anteroposterior direction and the opening dimension in a vertical direction of the enlarged-diameter region, main region of the conduit and the upper inflatable portion are measured in a flattened and uninflated state of the airbag.

In order to stably support the enlarged-diameter region of the conduit, the inlet-side inflatable portion is desirably located in an area ranging from the bottom area of the peripheral portion in the lower periphery of the airbag to a top area of the peripheral portion in an upper edge of the airbag. In this case, the opening dimension in a vertical direction of the enlarged-diameter region is desirably in a range of ¼ to ⅙ of that of the inlet-side inflatable portion. If the opening dimension in a vertical direction of the enlarged-diameter region surpasses ¼ of that of the inlet-side inflatable portion, the volume of the enlarged-diameter region will be increased, and it will be required to use an inflator with a higher output in order to inflate the whole primary inflatable portion quickly, which is not preferable. If the opening dimension of the enlarged-diameter region is less than ⅙ of that of the inlet-side inflatable portion, that dimension will not be sufficient for the enlarged-diameter region to hold the shape retention characteristics at airbag inflation for stably preventing an occlusion of the conduit.

The opening dimension in a vertical direction of the enlarged-diameter region is desirably 70 mm and above in the light of rigidity of the enlarged-diameter region at inflation. Taking into consideration that the airbag can be used for various types of vehicle and that the opening dimension of the enlarged-diameter region is preferably ¼ to ⅙ of that of the inlet-side inflatable portion, the preferable range of the opening dimension of the enlarged-diameter region in practice will be 70 to 120 mm, and more preferably 80 to 120 mm.

The opening dimension in a vertical direction at the outlet port of the main region of the conduit is desirably 30 mm and above in the light of stably preventing an occlusion of the conduit and, desirably not over 70 mm and further desirably not over 60 mm in the light of preventing an outflow of inflation gas to the secondary inflatable portion during the inflation of the primary inflatable portion. Therefore, the preferable range of the opening dimension in a vertical direction at the outlet port of the main region of the conduit will be 30 to 70 mm, and more desirably 30 to 60 mm.

It will also be appreciated in the above invention that the airbag includes two of the protection portions that are located in front and at the rear of the secondary inflatable portion and that the conduit is communicated with the inlet-side inflatable portion of either one of the protection portions and is located at a vicinity of the center of the airbag in an anteroposterior direction together with the secondary inflatable portion.

With this configuration, the secondary inflatable portion is located between a front protection portion adapted to protect an occupant seated in a front seat and a rear protection portion adapted to protect an occupant seated in a rear seat, i.e. in an area that is not intended to receive an occupant's head. This is an efficient arrangement of the secondary inflatable portion with respect to the whole airbag. Moreover, when an area of the secondary inflatable portion proximate the lower periphery of the airbag is going to cave in upward on the rebounding action immediately after deployment of the primary inflatable portion, the front protection portion and rear protection portion attempt to intrude into a lower side of the secondary inflatable portion and bend the main region of the conduit forcibly. With the configuration of the invention, however, since the inlet-side inflatable portion, the enlarged-diameter region of the conduit and the upper inflatable portion communicated with the inlet-side inflatable portion help the main region of the conduit to resist the bending and therefore keep the conduit open.

In this case, it will also be appreciated that the front protection portion and the rear protection portion are designed to cover the inboard side of two side windows located in front and rear of a pillar of vehicle so the conduit is deployable on the inboard side of the pillar. With this configuration, the upper inflatable portion inflates immediately above the conduit whereas the inlet-side inflatable portion inflates on the area of the window together with the enlarged-diameter region, and thus help position the conduit at a predetermined position on the lower periphery of the airbag although the pillar is positioned inward relative to the side window. Further, having the opening dimensions in a vertical direction greater than that of the main region of the conduit, the upper inflatable portion and the enlarged-diameter region secure thicknesses at inflation thicker than the main region. Accordingly, even in the event that an occupant's head approaches the location of the main region of the conduit that is located on the inboard side of the pillar projecting inward relative to the window, the head is received by the upper inflatable portion and the enlarged-diameter region surrounding the main region securely, thus the main region is not occluded by the occupant's head and smoothly feeds the inflation gas in the protection portion to the secondary inflatable portion and prevents a pressure increase of the protection portion.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
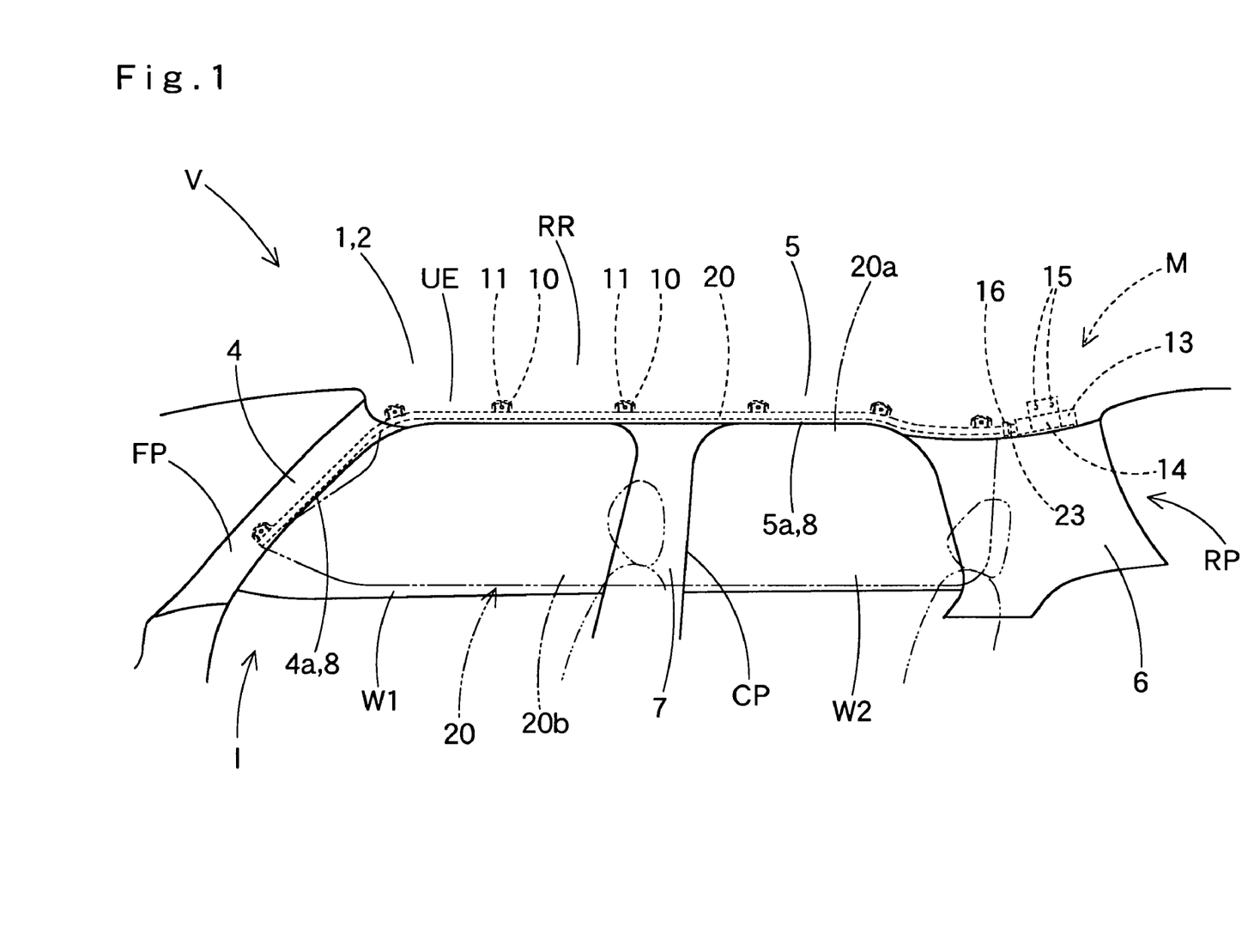
FIG. 1 is a schematic front view of an airbag apparatus employing a head-protecting airbag embodying the invention as mounted on vehicle.

FIG. 1 illustrates a head-protecting airbag 20 embodying the present invention as part of a head-protecting airbag apparatus M. The airbag 20 is folded up and housed in upper peripheries UE of side windows W1 and W2 at sides of a front seat and a rear seat inside a vehicle V for deployment downward to cover the side windows W1 and W2 when fed with inflation gas. The head-protecting airbag apparatus M includes an airbag 20, an inflator 13, mounting brackets 10, a bracket 14 and an airbag cover 8. The airbag 20 is folded up and housed in a range of the upper peripheries UE of the side windows W1 and W2 in an interior of vehicle V from a lower end region of a front pillar FP to an upper side of a rear pillar RP via a lower periphery of a roof side rail RR.

Referring to FIG. 1, the inflator 13 has a substantially columnar shape and is inserted into and coupled with a later-described joint port 23 of the airbag 20 for supplying inflation gas. A clamp 16 is used to couple the inflator 13 and the joint port 23. The inflator 13 is secured to an inner panel 2 at a position above the rear pillar RP by the bracket 14, and is covered by a lower periphery 5a of a roof head liner 5. The inner panel 2 is part of the vehicle body structure 1. The bracket 14 is made of sheet metal and is secured to the inner panel 2 by mounting bolts 15 while holding the inflator 13.

The mounting brackets 10 secure mounting portions 43 (FIG. 2) of the airbag 20 to the inner panel 2 by mounting bolts 11. The bolts 11 are fastened into unillustrated screw holes on the inner panel 2.

As shown in FIG. 1, the airbag cover 8 is comprised of a lower edge region 4a of a front pillar garnish 4 arranged on the front pillar FP and a lower edge region 5a of the roof head liner 5 arranged on the roof side rail RR. The front pillar garnish 4 and the roof head liner 5 are fabricated of synthetic resin and are respectively secured to the inboard side of the inner panel 2 at the front pillar FP and roof side rail RR. The roof head liner 5 is disposed from an upper side of the front pillar FP to the upper side of the rear pillar RP via an upper side of a center pillar CP. On the inboard side of each of the rear pillar RP and center pillar RP is a rear pillar garnish 6/a center pillar garnish 7 each of which is of synthetic resin.

Figure 8A:
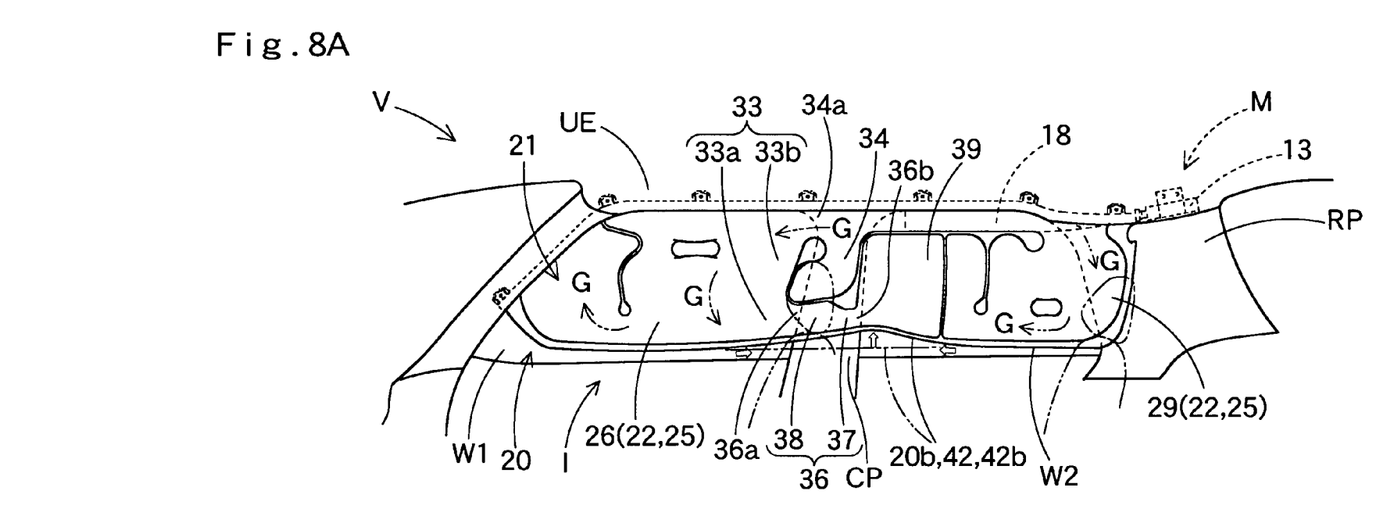
FIG. 8A illustrates the airbag of FIG. 2 at the rebound of a lower periphery of the airbag.
Figure 8B:
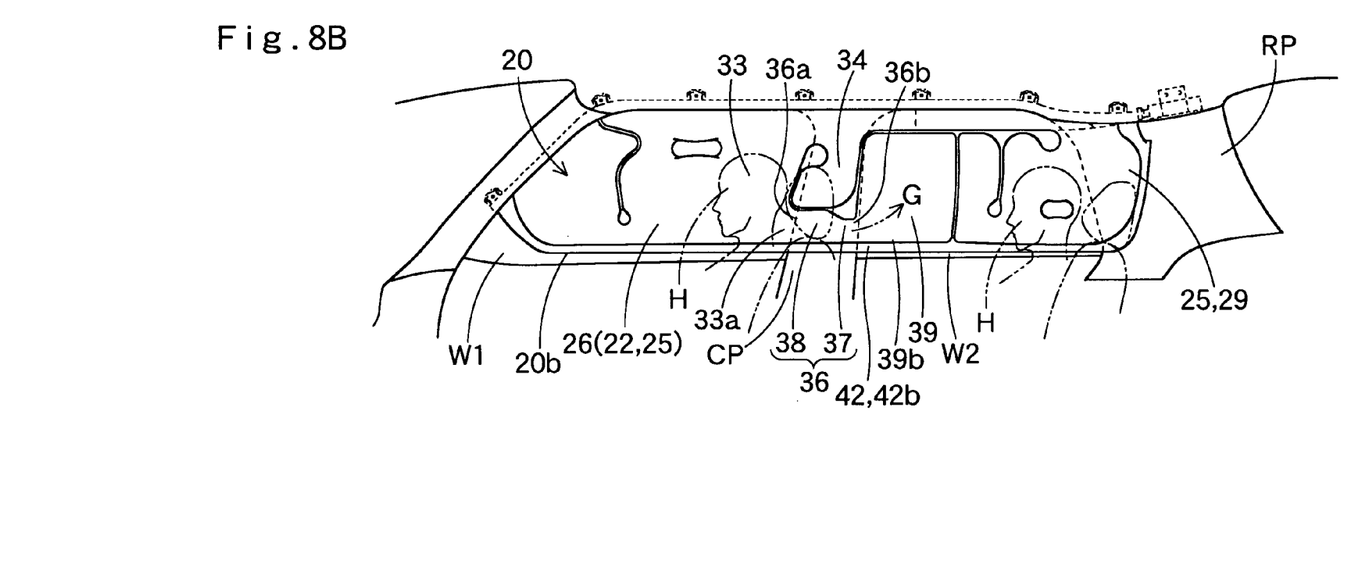
FIG. 8B illustrates the airbag of FIG. 2 when receiving heads of occupants.

As shown in FIGS. 1, 8A and 8B, when fed with inflation gas G from the inflator 13, the airbag 20 deploys downward from the upper peripheries UE of the side windows W1 and W2 and covers inboard side I of the windows W1 and W2, the center pillar garnish 7 of the center pillar CP and the rear pillar garnish 6 of the rear pillar RP. Referring to FIGS. 2 to 5, the airbag 20 includes a gas admissive portion 21 inflatable with inflation gas G by separating an inner panel 21a and an outer panel 21b and a non-admissive portion 41 that admits no inflation gas and keeps the inner panel 21a and outer panel 21b attached together. The airbag 20 has a hollow-weave or one-piece woven construction of polyamide yarn, polyester yarn or the like except a later-described mounting portion 43(F) located on the front end 20c. The mounting portion 43(F) is prepared separately as a cloth member woven by polyamide yarn, polyester yarn or the like and joined to the front end 20c of the airbag 20 by sewing or the like.

Figure 2:
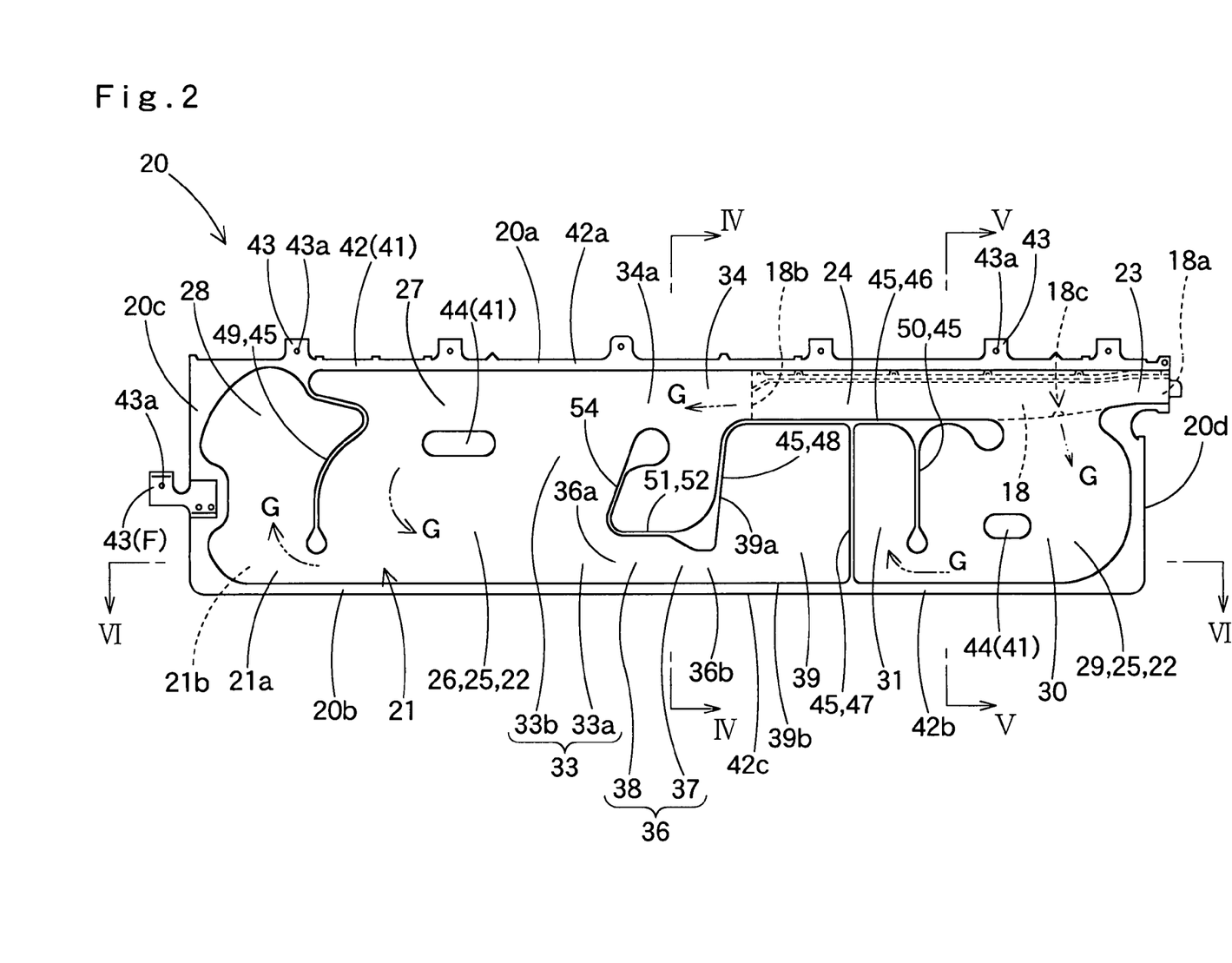
FIG. 2 is a front view of the airbag of the embodiment as flattened.

As shown in FIGS. 2 and 8B, the airbag 20 of this specific embodiment includes a front protection portion 26 inflatable on the inboard side of the front side window W1 and the center pillar CP and a rear protection portion 29 inflatable on the inboard side of the rear side window W2 (more particularly, a rear area of the side window W2) and the rear pillar RP.

The non-admissive portion 41 includes a peripheral portion 42, mounting portions 43, partitioning portions 44 and partitioning portions 45. The peripheral portion 42 is arranged around the gas admissive portion 21. The mounting portions 43 are formed in plurality to project upward from a top area 42a of the peripheral portion 42 at the upper periphery 20a of the airbag 20 or to project forward from the front end 20c of the airbag 20. Each of the mounting portions 43 includes an aperture 43a for receiving the mounting bolt 11. As described above, the mounting portions 43 are provided with the mounting brackets 10 and secured to the inner panel 2 by the mounting bolts 11 inserted into the apertures 43a and screwed into predetermined screw holes of the inner panel 2.

Each one partitioning portion 44 is formed on the front protection portion 26 and rear protection portion 29 as shown in FIG. 2. Each of the partitioning portions 44 is oval in shape as viewed from an interior of vehicle. The partitioning portions 44 are provided to regulate thicknesses of the front protection portion 26 and rear protection portion 29 such that the protection portions 26 and 29 inflate into plate-like shapes along the side windows W1 and W2 at airbag deployment. The partitioning portion 45 extends from the peripheral portion 42 in a linear fashion and includes a horizontal line portion 46, vertical line portions 47, 48, 49 and 50, and an upper boundary portion 51. The partitioning portion 45 partitions the gas admissive portion 21 into a primary inflatable portion 22 and secondary inflatable portion 39, partitions the primary inflatable portion 22 into the joint port 23, a later-described gas feed passage 24 and a protection portion 25, and further forms a later-described conduit 36 inside the protection portion 25.

As best shown in FIG. 2, the vertical line portion 47 extends upward from the vicinity of the center 42c (more particularly, a position slightly rear of the center) in an anteroposterior direction of the bottom area 42b of the peripheral portion 42 in the lower periphery 20b of the airbag 20. The horizontal line portion 46 extends to the front and rear from the upper end of the vertical line portion 47 in a bifurcating matter at right angles with the vertical line portion 47. The vertical line portion 48 extends downward from the front end of the horizontal line portion 46.

The vertical line portion 49 extends downward from the top area 42a of the peripheral portion 42 at the front end 20c in the upper periphery 20a of the airbag 20. The vertical line portion 49 partitions the front protection portion 26 into a main area 27 having a big volume and a small cell 28 having a small volume in a communicating manner. The vertical line portion 50 extends downward from the vicinity of the rear end of the horizontal line portion 46. The vertical line portion 50 partitions the rear protection portion 29 into a main area 30 having a big volume and a small cell 31 having a small volume in a communicating manner. The vertical line portions 49 and 50 serve to prevent a pressure increase in the main areas 27 and 30 before the inflation of a later-described secondary inflatable portion 39 by letting out inflation gas G into the small cells 28 and 31 as well as limit the thicknesses of the front protection portion 26 and rear protection portion 29 at full inflation of the airbag.

Figure 3:
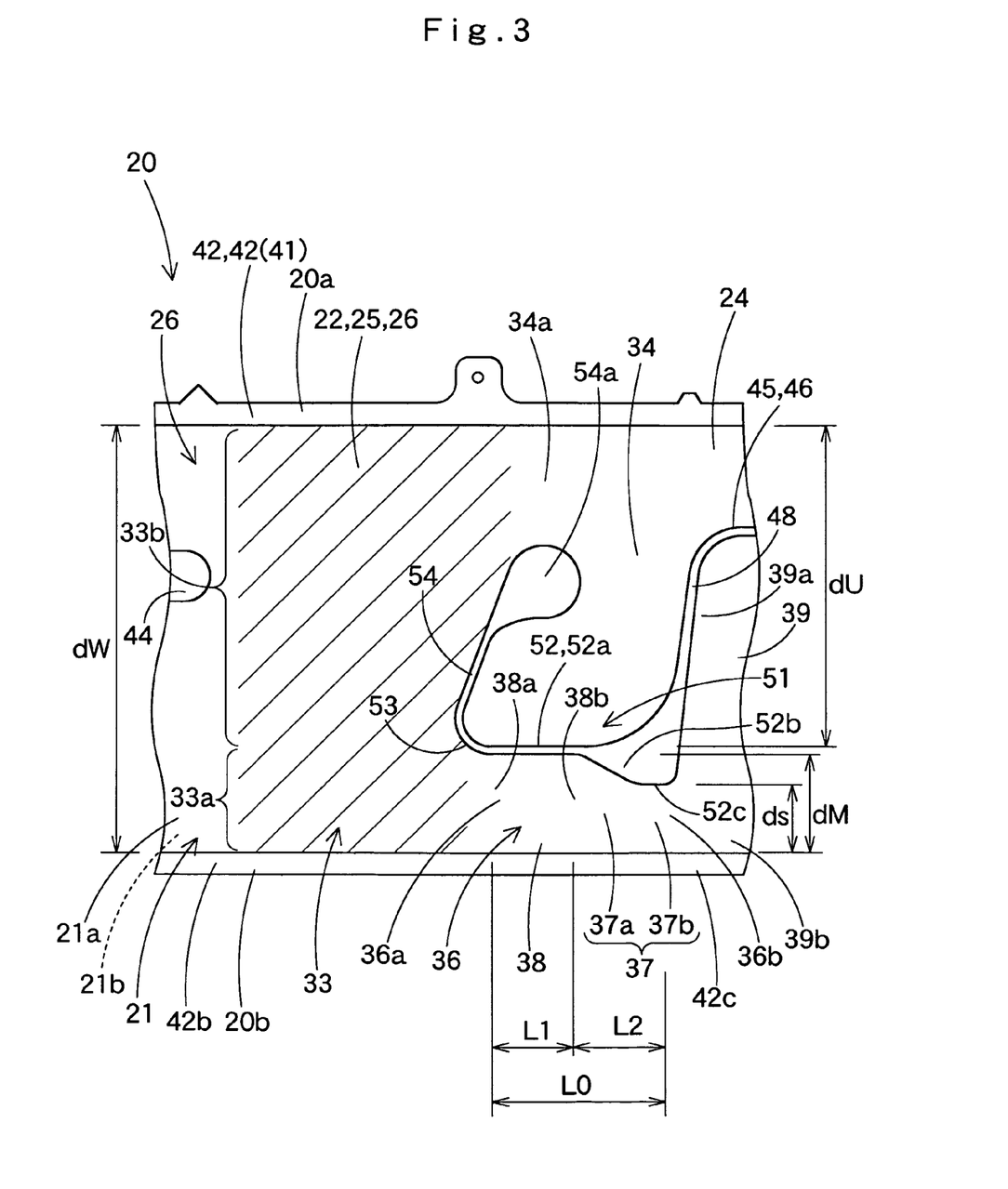
FIG. 3 is an enlarged front view of the airbag of FIG. 2 showing the vicinity of a conduit.

Referring to FIG. 3, the upper boundary portion 51 extends forward from the bottom end of the vertical line portion 48 and defines the upper boundary of the conduit 36. The upper boundary portion 51 includes a main portion 52 that extends forward from the bottom end of the vertical line portion 48, a crossing portion 53 that extends from the front end of the main portion 52 in such a manner as to curve upward in a ¼ arcuate fashion, and an extension portion 54 extending further upward, and thus having a L shape. The main portion 52 defines a boundary between the conduit 36 and a later-described upper inflatable portion 34 whereas the extension portion 54 defines a boundary between a later-described inlet-side inflatable portion 33 and the upper inflatable portion 34. The main portion 52 includes a straight portion 52a which extends along an anteroposterior direction at the rear of the crossing portion 53 with a uniform width in a vertical direction and an expanding portion 52b that extends rearward from the rear end of the straight portion 52a in a downward expanding manner. The lower edge 52c located proximate the rear end of the expanding portion 52b extends straightly along an anteroposterior direction. Further; the upper end region 54a of the extension portion 54 has a generally circular bulged shape.

Figure 6:
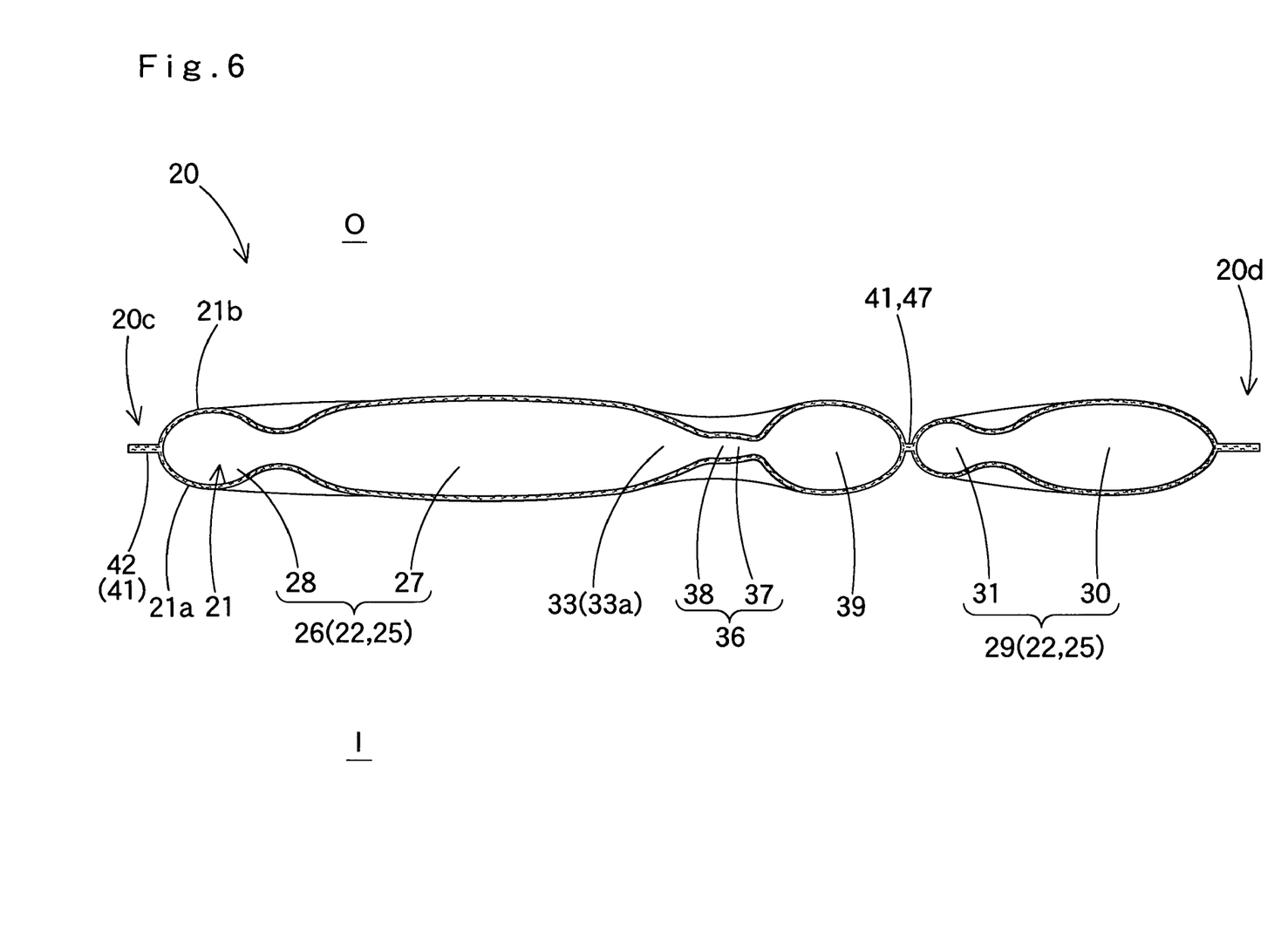
FIG. 6 is a horizontal section taken along line VI-VI of FIG. 2 at full deployment of the airbag including a secondary inflatable portion.

Referring to FIGS. 2 and 6, the gas admissive portion 21 includes a primary inflatable portion 22 inflatable in an early stage of airbag deployment for receiving an occupant's head and a secondary inflatable portion 39 that is in gas communication with the primary inflatable portion 22 and admits inflation gas G from the primary inflatable portion 22 for restraining a pressure increase of the primary inflatable portion 22.

The primary inflatable portion 22 includes a joint port 23, a gas feed passage 24, a protection portion 25 and a conduit 36. The protection portion 25 includes a front protection portion 26 and a rear protection portion 29 for respectively protecting an occupant seated in the front seat/the rear seat. Specifically, the front protection portion 26 is deployable on the inboard side of the front side window W1 and center pillar CP whereas the rear protection portion 29 is deployable on the inboard side of the rear side window W2 and the rear pillar RP as shown in FIG. 8B.

As shown in FIG. 2, the gas feed passage 24 is arranged straightly in an anteroposterior direction of the vehicle V along the upper periphery 20a of the airbag 20 and extends above the horizontal line portion 46 in such a manner as to communicate the front protection portion 26 and the rear protection portion 29.

Figure 5:
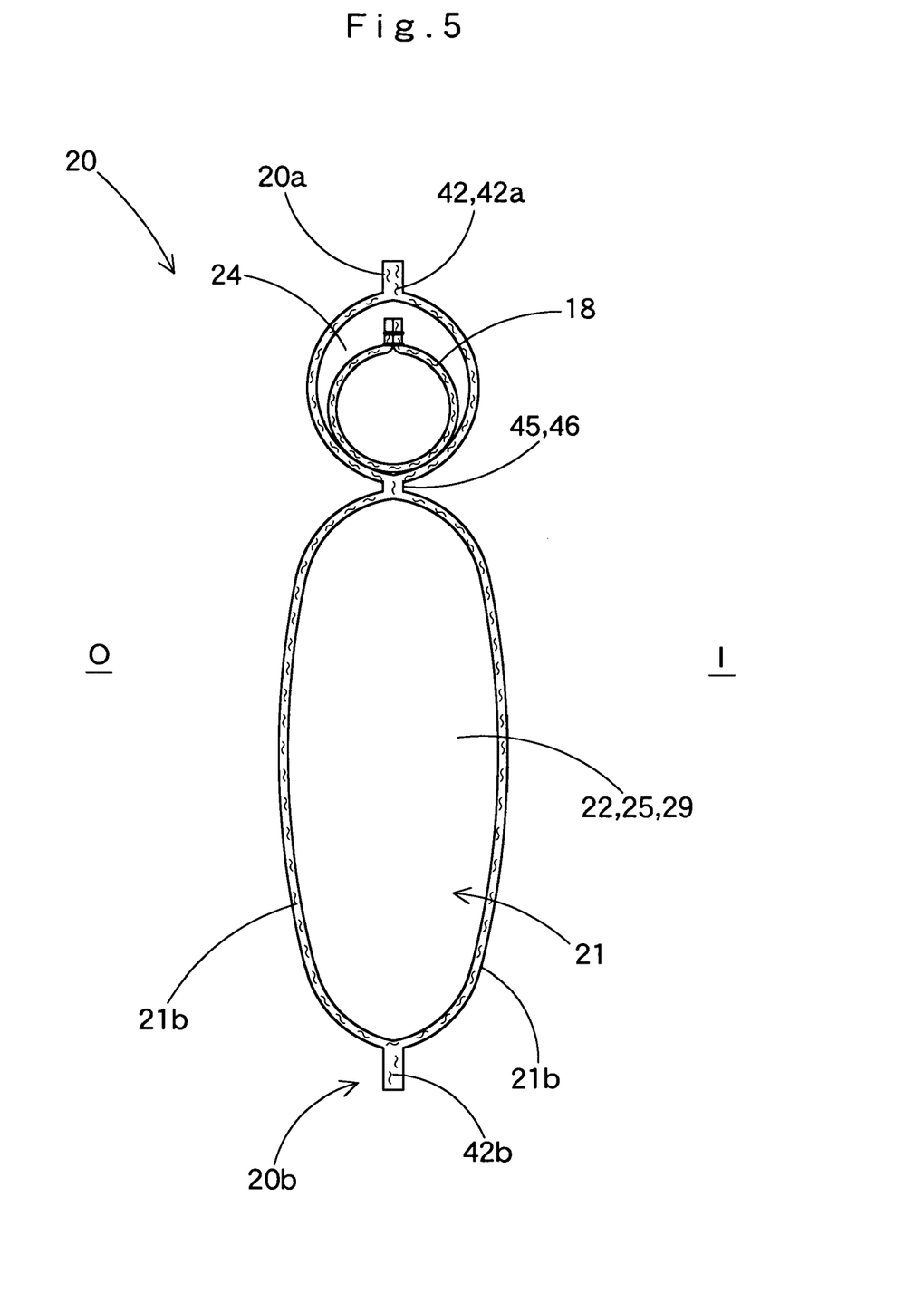
FIG. 5 is a vertical section taken along line V-V of FIG. 2 at full deployment of the primary inflatable portion.

Referring to FIG. 2, the joint port 23 is so located as to project rearward from the rear end 20d of the upper periphery 20a of the airbag 20 for connection with the inflator 13 and admitting inflation gas G from the inflator 13. Inside the joint port 23 is a cylindrical inner tube 18 (FIGS. 2 and 5). The inner tune 18 includes at the rear end an inset port 18a for receiving the inflator 13. The inflator 13 is inserted into the inset port 18a of the inner tube 18 placed inside the joint port 23 and fastened with the clamp 16, thus connected with the joint port 23. The inner tube 18 includes at the front end a first outlet 18b for feeding inflation gas G from the inflator 13 and gas feed passage 24 to the front protection portion 26, and a second outlet 18c that feeds gas G to the rear protection portion 29 at the underside above the main area 30 of the rear protection portion 29 and at the rear of the rear end of the horizontal line portion 46. In this specific embodiment, the first outlet 18b is located slightly at the rear of the horizontal line portion 46.

The secondary inflatable portion 39 is located below the gas feed passage 24 at a vicinity of the center in an anteroposterior direction of the airbag 20 and between the front protection portion 26 and rear protection portion 29. The secondary inflatable portion 39 of this embodiment is a generally rectangular area defined by the horizontal line portion 46, vertical line portions 47, 48, and the central region 42c of the bottom area 42b of the peripheral portion 42 in the lower periphery 20b of the airbag 20.

The conduit 36 that communicates the primary inflatable portion 22 and the secondary inflatable portion 39 extends in an anteroposterior direction of the airbag 20 from an inlet port 36a at a side of the protection portion 25 to an outlet port 36b to the secondary inflatable portion 39. The conduit 36 is located adjacent the central region 42c of the bottom area 42b of the peripheral portion 42 at a vicinity of the center in an anteroposterior direction of the airbag 20. The conduit 36 is formed between the upper boundary portion 51 that extends forward from the front edge 39a of the secondary inflatable portion 39 and the bottom area 42b of the peripheral portion 42. That is, the upper boundary portion 51 defines the upper boundary of the conduit 36. Furthermore, referring to FIG. 3, the conduit 36 includes a main region 37 located close to the outlet port 36b and an enlarged-diameter region 38 located close to the inlet port 36a and in front of the main region 37. Specifically, the enlarged-diameter region 38 is formed immediately below the straight portion 52a of the main portion 52 of the upper boundary portion 51 and extends straightly along an anteroposterior direction. The opening dimension dM in a vertical direction of the enlarged-diameter region 38 is configured greater than the opening dimension dS of the outlet port 36b in a vertical direction. The main region 37 is formed immediately below the expanding portion 52b of the main portion 52 of the upper boundary portion 51, and includes a tapering region 37a that is gas communicated with the rear end 38b of the enlarged-diameter region 38 and tapers toward the rear in vertical opening dimension and a straight region 37b that is located immediately below the straight lower edge 52c of the expanding portion 52b.

In this specific embodiment, the inlet port 36a of the conduit 36 is located at the front end 38a of the enlarged-diameter region 38 whereas the outlet port 36b is located at the rear end of the straight region 37b of the main region 37. Thus the opening dimension dM in a vertical direction of the enlarged-diameter region 38 equals to the opening dimension of the inlet port 36a whereas the opening dimension in a vertical direction of the straight region 37b of the main region 37 equals to the opening dimension dS in a vertical direction of the outlet port 36b.

Around the conduit 36 are an inlet-side inflatable portion 33 and an upper inflatable portion 34 both of which are part of the front protection portion 26. The inlet-side inflatable portion 33 is formed in front of and in gas communication with the conduit 36 as indicated by a shaded area in FIG. 3, and includes an opposing region 33a that adjoins the inlet port 36a of the conduit 36 in such a manner as to oppose the inlet port 36a in an anteroposterior direction, and an upper extending region 33b that is located above the opposing region 33a and extends upward up to a higher level relative to the inlet port 36a. The upper extending region 33b of the illustrated embodiment is located in front of the extension portion 54 of the upper boundary portion 51 and extends up to the top area 42a of the peripheral portion 42 in the upper periphery 20a of the airbag 20. That is, the inlet-side inflatable portion 33 of the illustrated embodiment, which includes the opposing region 33a and upper extending region 33b, is located on an entire vertical area of the airbag 20, from bottom to top of the peripheral portion 42.

The upper inflatable portion 34 is located above the conduit 36, partitioned from the conduit 36 by the upper boundary portion 51. The opening dimension dU in a vertical direction of the upper inflatable portion 34 is configured greater than the opening dimension dM in a vertical direction of the enlarged-diameter region 38 of the conduit 36 as shown in FIG. 3. The upper inflatable portion 34 includes at the front end a communication port 34a for gas communication with the upper extending region 33b such that the upper inflatable portion 34 inflate generally simultaneously with the inlet-side inflatable portion 33 at the inflation of the primary inflatable portion 22. In the illustrated embodiment, the upper inflatable portion 34 is located adjacent the front end of the gas feed passage 24.

In the illustrated embodiment, the conduit 36 and the upper inflatable portion 34 are designed deployable on the inboard side of the center pillar CP as shown in FIG. 8B.

In order that the inflation gas G of the primary inflatable portion 22 is fed to the secondary inflatable portion 39 after the primary inflatable portion 22 completes inflation, not immediately, the conduit 36 is configured to secure a predetermined length L0 (FIG. 3) and have a restrained opening area in a direction orthogonal to the axial direction from the inlet port 36a to the outlet port 36b, i.e., the opening dimensions dM and dS in a vertical direction which is smaller than that of the inlet-side inflatable portion 33.

In the conduit 36 of this embodiment, especially, the length L1 in an anteroposterior direction and the opening dimension dM in a vertical direction of the enlarged-diameter region 38 is so configured that the enlarged-diameter region 38 inflate together with the inlet-side inflatable portion 33 and the upper inflatable portion 34 in an integrated manner at the inflation of the primary inflatable portion 22 in order that the enlarged-diameter region 38 retains its shape and does not cause an occlusion of the main region 37 of the conduit 36 when the lower periphery 20b of the airbag 20 attempts to move upward on the rebound of deployment immediately after the completion of deployment of the primary inflatable portion 22. Moreover, the length L1 in an anteroposterior direction of the enlarged-diameter region 38 is configured equal to or smaller than the opening dimension dM in a vertical direction so as to restrain an outflow of inflation gas G into the secondary inflatable portion 39 during the inflation of the primary inflatable portion 22.

In the illustrated embodiment, the length L0 in an anteroposterior direction of the conduit 36 is 160 mm. The length L1 in an anteroposterior direction of the enlarged-diameter region 38 is 75 mm and the opening dimension dM in a vertical direction of the region 38 is 100 mm. The length L2 in an anteroposterior direction of the main region 37 of the conduit 36 is 85 mm and the opening dimension dS in a vertical direction of the main region 37 is 60 mm.

Furthermore, in the airbag 20 of this specific embodiment, the opening dimension dM (i.e. 100 mm) in a vertical direction of the enlarged-diameter region 38 is configured in a range of ¼ to ⅙ of the opening dimension dW in a vertical direction of the inlet-side inflatable portion 33, which is 420 mm.

The airbag 20 is manufactured by hollow-weaving and connecting the mounting portion 43(F) to the front end 20c of the airbag 20. Then the inner tube 18 is inserted into the joint port 23 for connection with the inflator 13. Before mounting on the vehicle, the airbag 20 is folded up in such a manner as to bring the lower periphery 20b close to the upper periphery 20a where the mounting portions 43 are formed and then an unillustrated breakable wrapping member is mounted around the folded-up airbag 20 for keeping the folded-up configuration. Subsequently, the inflator 13 equipped with the bracket 14 for mounting is coupled to the joint port 23 of the airbag 20 with the inner tube 18 housed by the clamp 16. An airbag module is completed by attaching the mounting brackets 10 to the mounting portions 43 of the airbag 20.

The airbag module thus manufactured is mounted on the vehicle body 1 by locating the brackets 10 and 14 on predetermined locations on the inner panel 2 of the vehicle body 1 and fastening the brackets thereto by mounting bolts 11 and 15. Then an unillustrated lead wire extending from a suitable control for actuating the inflator is connected to the inflator 13. If then the front pillar garnish 4, the roof head liner 5, the rear pillar garnish 6 and the center pillar garnish 7 are attached to the vehicle body 1, the airbag apparatus M is mounted on the vehicle V.

When the inflator 13 is actuated after the airbag apparatus M is mounted on the vehicle V, the inflation gas G discharged from the inflator 13 flows into the inner tube 18 from the joint port 23 and flows out of the outlets 18b and 18c as indicated by double-dashed lines in FIG. 2. The gas G flowing out of the outlet 18b flows into the front protection portion 26 via the front end region of the gas feed passage 24 whereas the gas G flowing out of the outlet 18c flows into the rear protection portion 29, thereby inflating the protection portions 26 and 29. Then the wrapping member gets broken and the airbag cover 8 constructed of the lower edges 4a and 5a of the front pillar garnish 4 and roof head liner 5 is pushed and opened, and the protection portions 26 and 29 deploy downward and cover the inboard side I of the side windows W1 and W2, the center pillar CP and the rear pillar RP as indicated by double-dashed lines in FIG. 1.

In operation of the airbag 20 of the invention, the protection portion 25 of the primary inflatable portion 22, i.e. the front protection portion 26 and rear protection portion 29, completes deployment firstly to cover the inboard side I of the side windows W1 and W2, the center pillar CP and the rear pillar RP. At this time, in an area surrounding the conduit 36, the inlet-side inflatable portion 33, the upper inflatable portion 34 and the enlarged-diameter region 38 of the conduit 36 inflate in an integrated manner and exert such shape retention characteristic as to prevent an occlusion of the main region 37 of the conduit 36 at the rebound of the lower periphery 20b of the airbag 20 immediately after the completion of the deployment of the primary inflatable portion 22. Specifically, the enlarged-diameter region 38 of the conduit 36 and the inlet-side inflatable portion 33 communicated with the enlarged-diameter region 38 (FIG. 7A) inflate together generally in a L-shape as shown in FIG. 8A in a rigid manner. The upper inflatable portion 34 communicated with the upper extension portion 33b of the inlet-side inflatable portion 33 inflates together with the enlarged-diameter region 38 as well. Coupled with its opening dimension dU in a vertical direction greater than that of the enlarged-diameter region 38, the upper inflatable portion 34 at inflation also exerts such a shape retention characteristic as to support the enlarged-diameter region 38, i.e. prevent the region 38 from tilting or moving upward.

Accordingly, even in the event that the lower periphery 20b of the airbag 20 attempts to move upward as a reaction to a downward deployment of the primary inflatable portion 22 while the secondary inflatable portion 39 is not yet inflated, the L-shaped inflated region constituted of the inlet-side inflatable portion 33 and enlarged-diameter region 38 as shown in FIG. 8A resists such movement and further the upper inflatable portion 34 also supports the enlarged-diameter region 38 in such a manner as to restrain an upward displacement of the region 38. Accordingly the lower periphery 20b of the airbag 20 in the vicinity of the main region 37 of the conduit 36 is prevented from moving upward, in other words from collapsing or bending to occlusion, thus securing a communication from the inlet port 36a to the outlet port 36b.

Figure 7A:
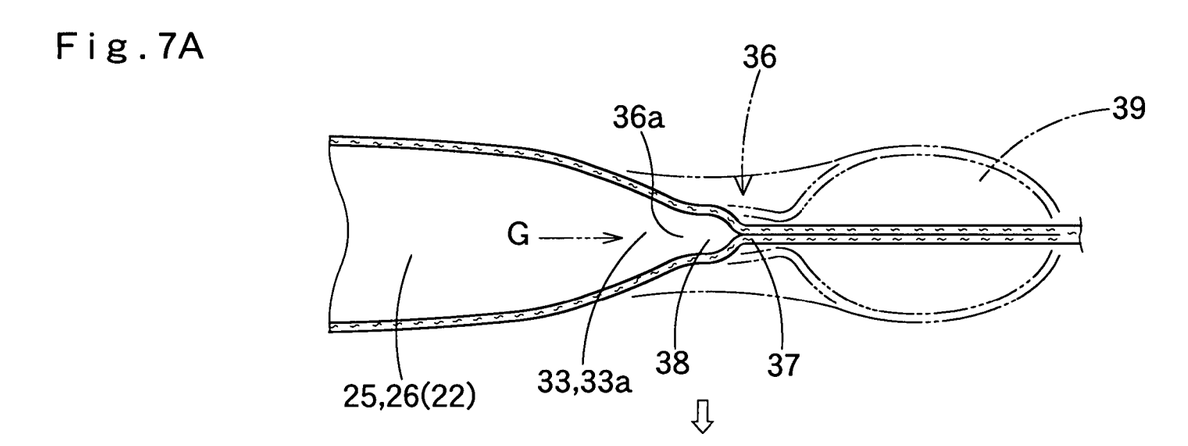
FIGS. 7A and 7B are partial enlarged horizontal sections illustrating in order a behavior of the secondary inflatable portion of the airbag at inflation.
Figure 7B:
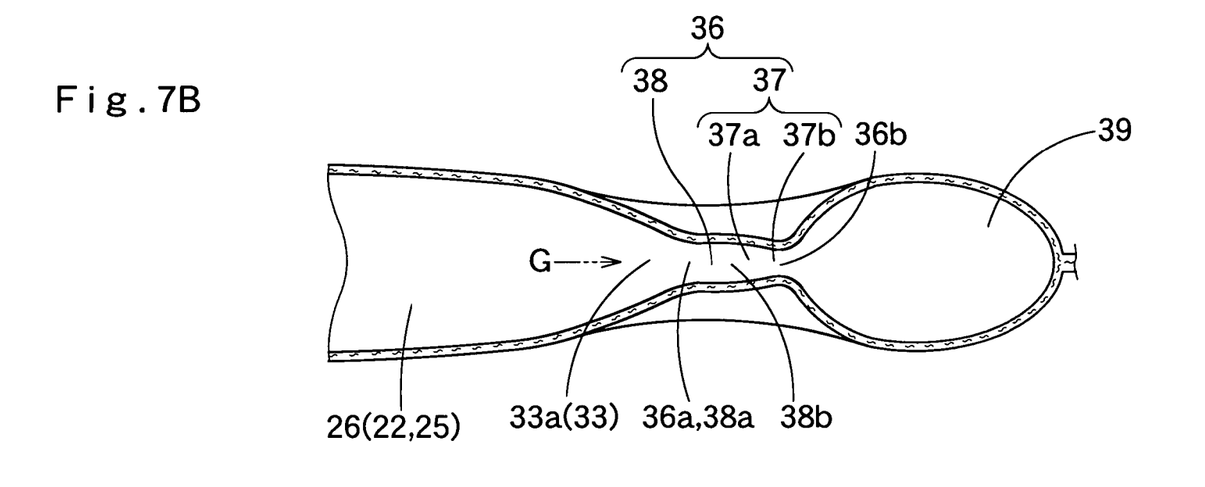

Thereafter, when the front protection portion 26 receives an occupant's head H and an inner pressure of the protection portion 26 is going to rise, the inflation gas G inside the protection portion 26 smoothly flows into the secondary inflatable portion 39 via an unoccluded, open passage of the conduit 36 as shown in FIGS. 7A, 7B and 8B, thus restraining a pressure increase of the protection portion 26 in a stable manner.

Therefore, the airbag 20 of the invention can prevent an occlusion of the conduit 36 and an increase of internal pressure of the protection portion 25 that may be caused by the occlusion right after the completion of inflation of the primary inflatable portion 22 in a steady fashion.

In the airbag 20, although the opening dimension dM in a vertical direction of the enlarged-diameter region 38 is designed greater than the opening dimension dS in a vertical direction of the main region 37 of the conduit 36, the length L1 (75 mm, in the illustrated embodiment) in an anteroposterior direction of the enlarged-diameter region 38 is shorter than the opening dimension dM (100 mm, in the illustrated embodiment) in a vertical direction. This configuration sufficiently restrains an outflow of inflation gas G from the front protection portion 26 into the secondary inflatable portion 39 during the inflation of the primary inflatable portion 22, and thus expediting the deployment of the primary inflatable portion 22. Accordingly, when the front protection portion 26 receives an occupant's head H after completion of the deployment of the primary inflatable portion 22, it is capable of catching the head H in a cushioning manner with the internal pressure suppressed, coupled with the smooth exhaust of inflation gas G into the secondary inflatable portion 39.

The inlet-side inflatable portion 33 of the airbag 20 is located in an area ranging from the bottom area 42b of the peripheral portion 42 in the lower edge 20b of the airbag 20 to the top area 42a of the peripheral portion 42 in the upper edge 20a of the airbag 20. That is, the inlet-side inflatable portion 33 is arranged over an entire vertical area of the airbag 20. Accordingly, at full deployment of the inlet-side inflatable portion 33, the opposing region 33a located at the lower side of the inlet-side inflatable portion 33 inflates together with the enlarged-diameter region 38 in an integrated rod shape, and thus supporting the enlarged-diameter region 38 in a stable manner without tilting the region 38 upward or downward. Moreover, the opening dimension dM in a vertical direction of the enlarged-diameter region 38 is configured at 100 mm, which is in a range of ¼ to ⅙ of the opening dimension dW (i.e. 420 mm) in a vertical direction of the inlet-side inflatable portion 33. This configuration helps secure the prevention of an occlusion of the conduit 36 while restraining an outflow of the inflation gas G into the secondary inflatable portion 39 during the inflation of the primary inflatable portion 22, and thus expediting the deployment of the primary inflatable portion 22. More specifically, if the opening dimension dM in a vertical direction of the enlarged-diameter region 38 surpasses ¼ of that of the inlet-side inflatable portion 33, the volume of the enlarged-diameter region 38 will be increased, and it will be required to use the inflator 13 with a higher output in order to inflate the whole primary inflatable portion 22 quickly, which is not preferable. If the opening dimension dM of the enlarged-diameter region 38 is less than ⅙ of that of the inlet-side inflatable portion 33, the opening dimension dM will not be sufficient for the enlarged-diameter region 38 to hold the shape retention characteristics at airbag inflation for stably preventing an occlusion of the conduit 36.

In the airbag 20, moreover, the protection portion 25 includes the front protection portion 26 located in front of the secondary inflatable portion 39 and the rear protection portion 29 located at the rear of the secondary inflatable portion 39. The conduit 36 is communicated with the inlet-side inflatable portion 33 of one of those protection portions, i.e. of the front protection portion 26, and is located at the vicinity of the center of the airbag 20 in an anteroposterior direction together with the secondary inflatable portion 39.

With this configuration, the secondary inflatable portion 39 is located between the front protection portion 26 designed to protect an occupant seated in a front seat and the rear protection portion 29 adapted to protect an occupant seated in a rear seat, i.e. in an area that is proximate the front end of the side window W2 where an occupant's head H is not supposed to be located and that is not intended to receive the head H (FIGS. 8A and 8B). This is an efficient arrangement of the secondary inflatable portion 39 in the whole airbag 20. If the secondary inflatable portion 39 is located between the two protection portions 26 and 39, when the bottom area 39b of the secondary inflatable portion 39 and its vicinity in the lower periphery 20b of the airbag 20 is going to cave in upward on the rebound immediately after deployment of the primary inflatable portion 22, the front protection portion 26 and rear protection portion 29 attempt to intrude into a lower side of the secondary inflatable portion 39 and bend the main region 37 of the conduit 36 forcibly. With the configuration of the foregoing embodiment, however, since the inlet-side inflatable portion 33, the enlarged-diameter region 38 of the conduit 36 and the upper inflatable portion 34 communicated with the inflatable portion 33 resist the bending of the main region 37 of the conduit 36 and therefore keep the conduit 37 open.

Figure 4:
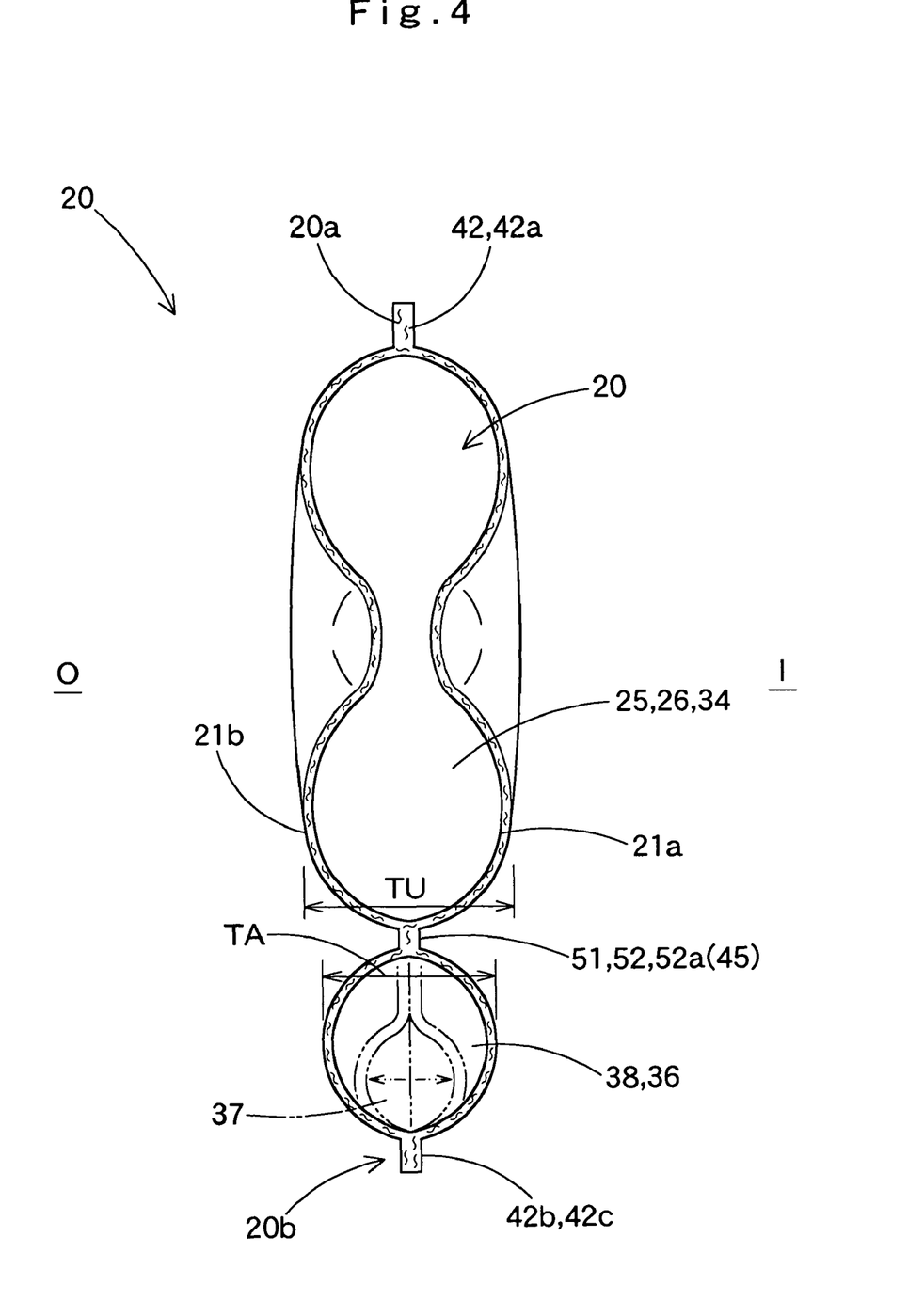
FIG. 4 is a vertical section taken along line IV-IV of FIG. 2 at full deployment of a primary inflatable portion.

Furthermore, in the foregoing embodiment, the front protection portion 26 and the rear protection portion 29 are designed to cover the inboard side I of the side windows W1 and W2 located in front and rear of the center pillar PC of the vehicle V so the conduit 36 is deployable on the inboard side I of the center pillar CP. Even with this configuration, the upper inflatable portion 34 located immediately above the conduit 36 and the enlarged-diameter region 38 both communicated with the inlet-side inflatable portion 33 inflate and help position the conduit 36 at a predetermined position on the lower periphery 20b of the airbag 20 at airbag deployment although the center pillar CP is positioned inward relative to the side window W1. Further, having the opening dimensions dU and dM in a vertical direction greater than that of the main region 37 of the conduit 36, the upper inflatable portion 34 and the enlarged-diameter region 38 secure thicknesses TU and TD at inflation thicker than the main region 37 as shown in FIG. 4. Accordingly, even in the event that an occupant's head H approaches the location of the main region 37 of the conduit 36 that is located on the inboard side I of the center pillar CP projecting inward I relative to the side window W1, the head H is received by the upper inflatable portions 34 and the enlarged-diameter region 38 surrounding the main region 37 securely, thus the main region 37 is not occluded by the occupant's head H and smoothly feeds the inflation gas G in the front protection portion 26 to the secondary inflatable portion 39 as shown in FIG. 7B and prevents a pressure increase of the front protection portion 26.

Figure 9:
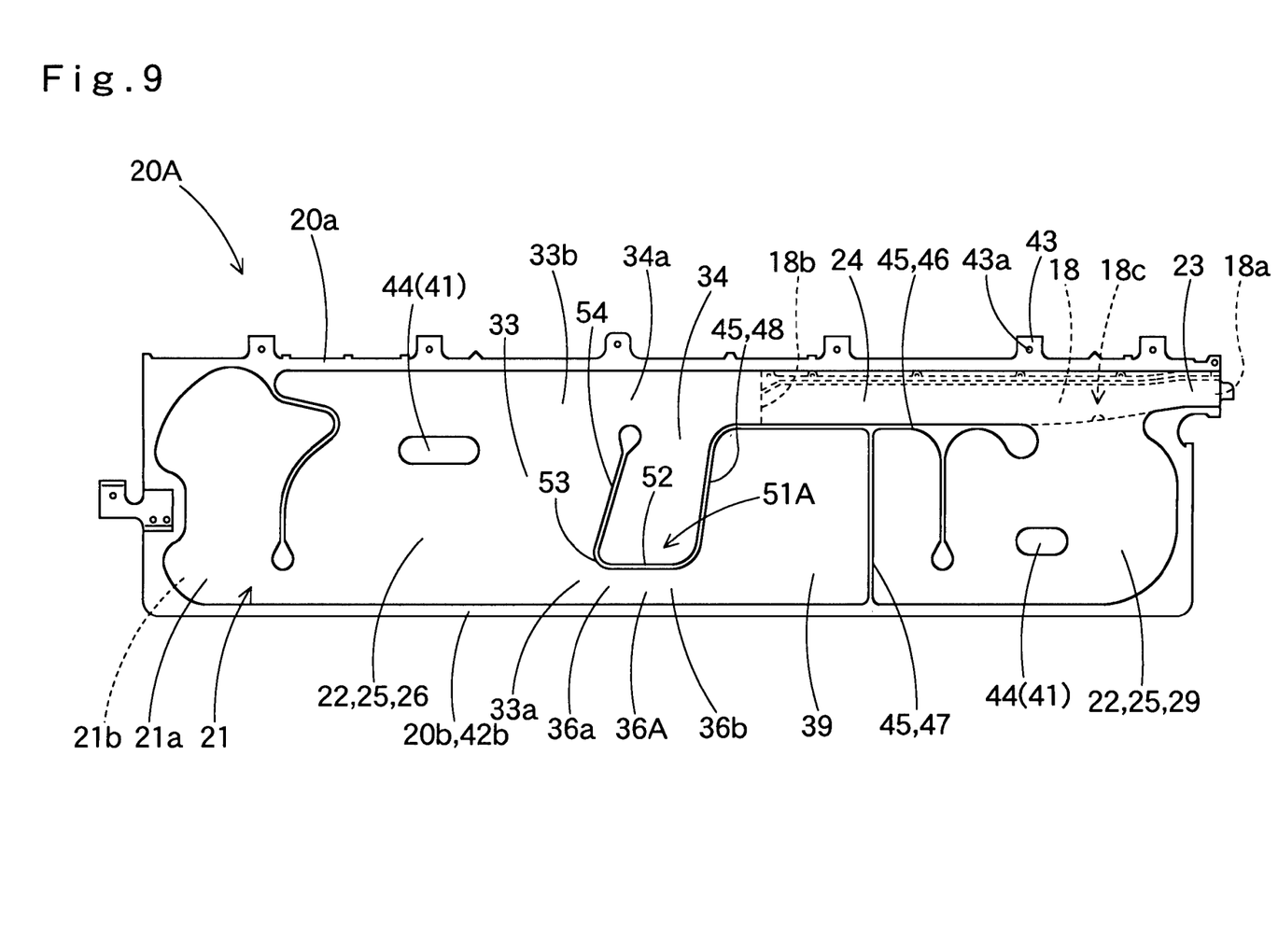
FIG. 9 is a front view of an airbag of a comparative example as flattened.
Figure 10:
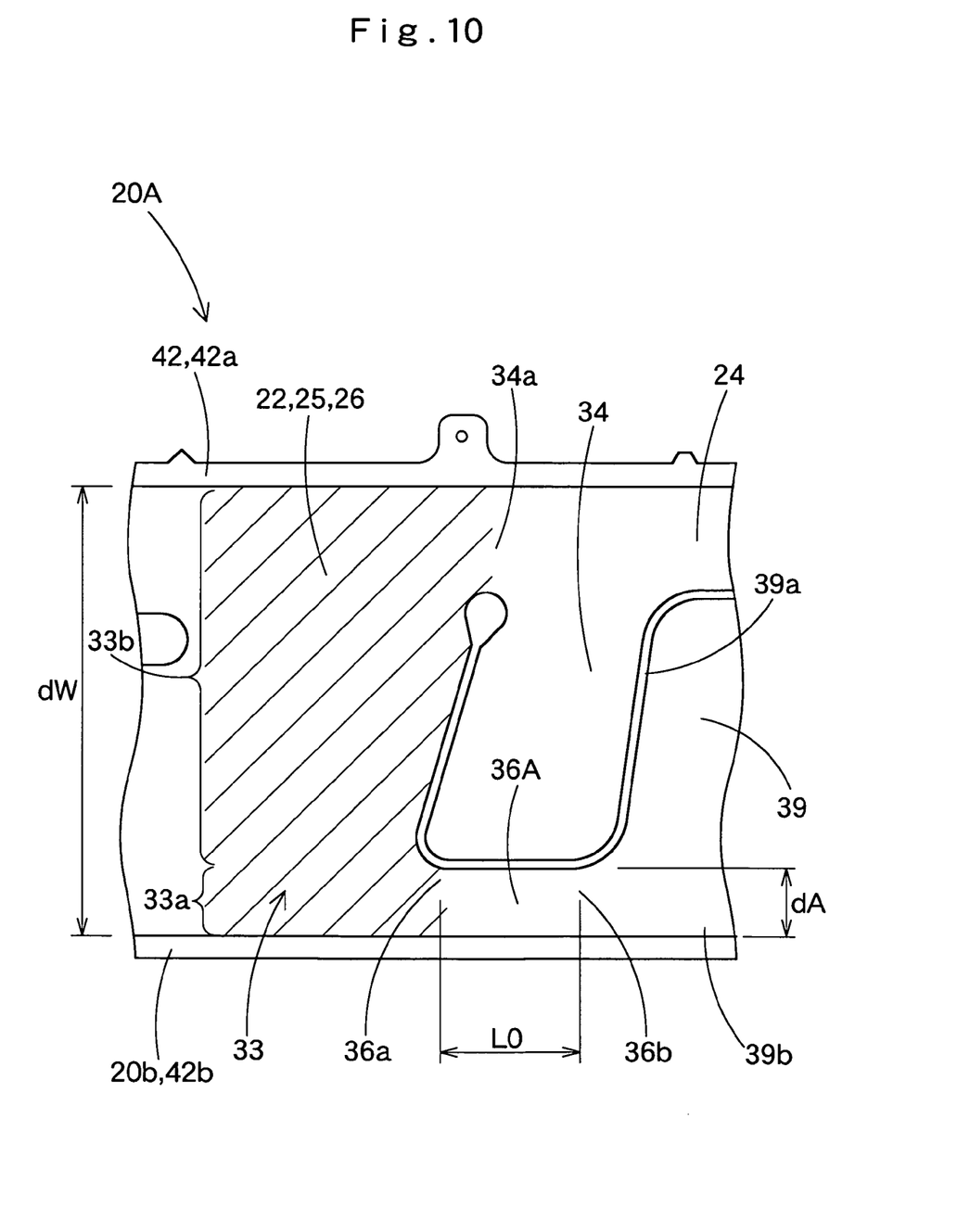
FIG. 10 is an enlarged front view of the airbag of FIG. 9 showing the vicinity of a conduit.
Figure 11:
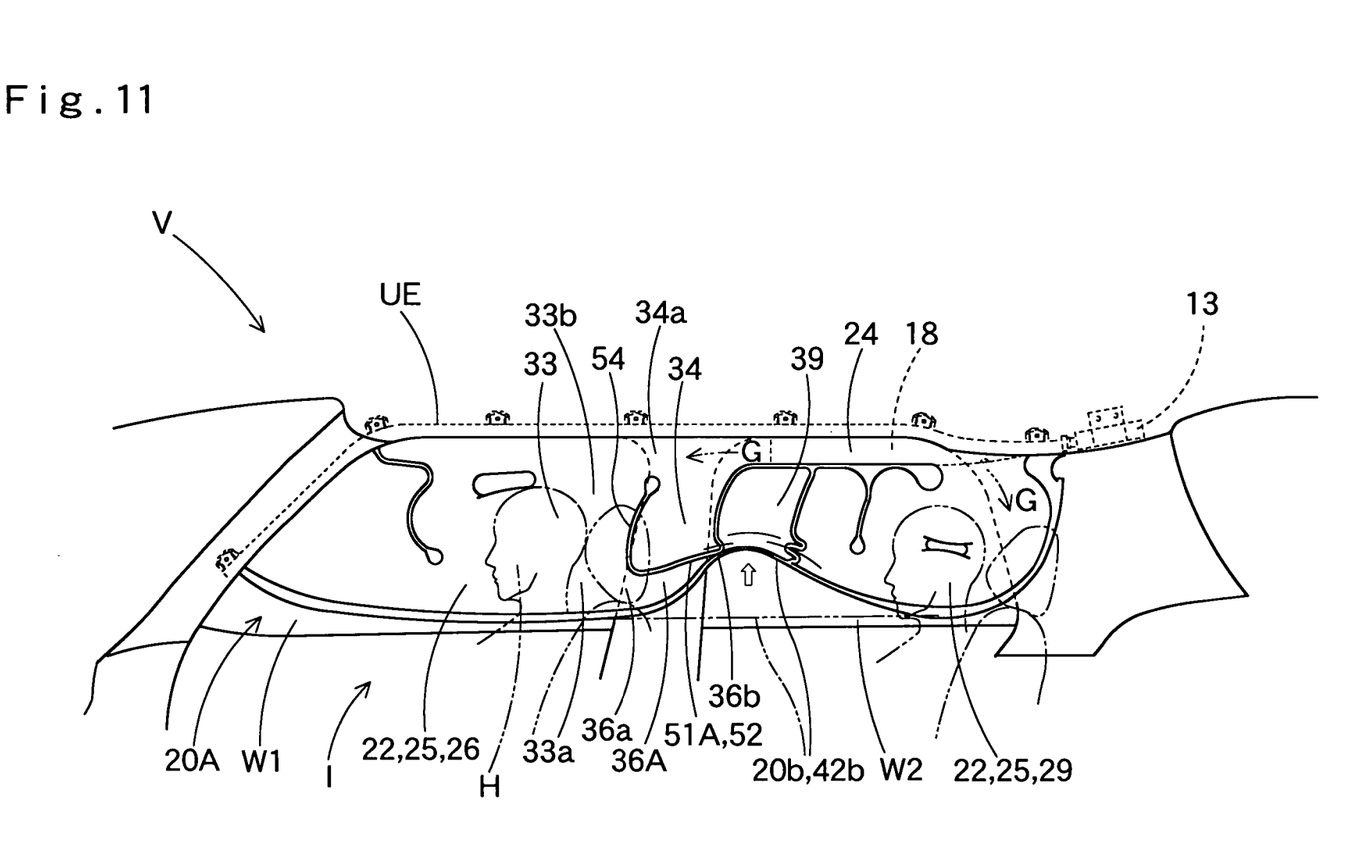
FIG. 11 illustrates the airbag of FIG. 9 at the rebound of a lower periphery of the airbag.

FIGS. 9, 10 and 11 illustrate an airbag 20A mounted on a vehicle V and subjected to a deployment test as a comparative example relative to the foregoing embodiment. The conduit 36A of the airbag 20A does not include an enlarged-diameter region and therefore, as shown in FIG. 11, at the rebounding action of the lower periphery 20b of the airbag 20A, an area around the outlet port 36b of the conduit 36 collapses, thus occluding the conduit 36A although the airbag 20A includes an upper inflatable portion 34 that is located above the conduit 36A and communicated with an inlet-side inflatable portion 33. The airbag 20A has generally identical configurations except those of an upper boundary portion 51A and the conduit 36A.

The conduit 36A of the comparative example has an identical length in an anteroposterior direction to that of the foregoing embodiment, i.e., 160 mm, but has a generally uniform opening dimension dA, which is 60 mm, over the entire length. The upper boundary portion 51A includes a main portion 52 that extends forward from the bottom end of the vertical line portion 48 on the front end 39a of the secondary inflatable portion 39, a curved crossing portion 53, and an extension portion 54 extending further upward.

As in the above-described embodiment, the opening dimension dW in a vertical direction of the inlet-side inflatable portion 33 communicated with the inlet port 36a of the conduit 36A is 420 mm which is generally identical to the vertical dimension of the airbag 20A.

The deployment test was conducted on another airbag (not illustrated in the accompanying drawings) wherein the opening dimension dA of the conduit 36A is 42 mm as another comparative example. The conduit 36A became occluded as well at the rebounding action of the lower periphery 20b of the airbag 20A.

The deployment test was also conducted on a modification of the above-described airbag 20 wherein only the opening dimension dS at the outlet port 36b of the main region 37 of the conduit 36 is changed to 42 mm from 60 mm of the airbag 20 (that is, in this modified airbag, similarly to the airbag 20, the length L0 in an anteroposterior direction of the conduit 36 is 160 mm. The length L1 in an anteroposterior direction of the enlarged-diameter region 38 is 75 mm and the opening dimension dM in a vertical direction of the region 38 is 100 mm. The length L2 in an anteroposterior direction of the main region 37 of the conduit 36 is 85 mm and the opening dimension dW in a vertical direction of the inlet-side inflatable portion 33 is 420 mm.) In this test, an occlusion of the conduit 36 did not occur when the lower periphery 20b of the airbag 20 attempted to move upward immediately after completion of deployment of the primary inflatable portion 22 since the enlarged-diameter region 38, the inlet-side inflatable portion 33 and the upper inflatable region 34 inflated in an integrated manner and exerted shape retention characteristics.

The opening dimension dW in a vertical direction of the inlet-side inflatable portion 33 is designed to fit the size of a side window of various types of vehicle, and therefore may vary in accordance with the type of vehicle. For example, the dimension dW will be 350 to 400 mm for a compact car, 400 to 500 mm for a standard-sized car, and 500 to 600 mm for a sport utility vehicle.

The opening dimension dM in a vertical direction of the enlarged-diameter region 38 is desirably 70 mm and above in the light of securing rigidity at inflation. Taking into consideration the differences among various types of vehicle and the above-described condition that the opening dimension dM should be ¼ to ⅙ of the opening dimension dW of the inlet-side inflatable portion 33, the preferable range of the opening dimension dM of the enlarged-diameter region 38 in practice will be 70 to 120 mm, and more preferably 80 to 120 mm.

The opening dimension dS in a vertical direction at the outlet port 36b of the main region 37 of the conduit 36 is desirably 30 mm and above in the light of stably preventing an occlusion of the conduit 36 and, desirably not over 70 mm and further desirably not over 60 mm in the light of preventing an outflow of inflation gas to the secondary inflatable portion 39 during the inflation of the primary inflatable portion 22. Therefore, the preferable range of the opening dimension dS in a vertical direction at the outlet port 36b of the main region 37 of the conduit 36 will be 30 to 70 mm, and more desirably 30 to 60 mm.

Although the conduit 36 of the foregoing embodiment has been described as communicated with the front protection portion 26, the conduit may be formed in communication with the rear protection portion 29 having an inlet-side inflatable portion.

Although the airbag of the foregoing embodiment has been described as having a hollow-weave or one-piece woven construction, the airbag may be manufactured by sewing an inner panel 21a and an outer panel 21b together.

What is claimed is:

1. A head-protecting airbag adapted to be mounted on an upper periphery of a window of a vehicle inside the vehicle for deployment downward to cover the window, the airbag comprising:
   a gas admissive portion inflatable with inflation gas by separating an inner panel and an outer panel, the gas admissive portion including:
   a primary inflatable portion inflatable in an early stage of airbag deployment, the primary inflatable portion including a protection portion that receives and protects a head of an occupant and a conduit that is tubular in shape and extends from the protection portion; and
   a secondary inflatable portion that is communicated with the protection portion of the primary inflatable portion by the conduit and admits inflation gas from the protection portion for restraining a pressure increase of the protection portion; and a non-admissive portion that admits no inflation gas and keeps the inner panel and outer panel attached together, the non-admissive portion including:
a peripheral portion located on an outer periphery of the gas admissive portion; and
a partitioning portion that defines boundaries of the secondary inflatable portion and the conduit, the partitioning portion including an upper boundary portion that extends from a periphery of the secondary inflatable portion and defines an upper boundary of the conduit,
wherein the conduit extends along an anteroposterior direction of the airbag and adjacent a bottom area of the peripheral portion in a lower periphery of the airbag from an inlet port from the protection portion to an outlet port to the secondary inflatable portion;
wherein the conduit includes:
a main region that is located on a side of the outlet port; and
an enlarged-diameter region that is located on a side proximate the inlet port and extends straightly, the enlarged-diameter region having an opening dimension in a vertical direction greater than that of the main region, the opening dimension in a vertical direction being equal to or greater than a length in an anteroposterior direction thereof;
wherein the protection portion includes:
an inlet-side inflatable portion adjoining the inlet port of the conduit in an anteroposterior direction, the inlet-side inflatable portion including an opposing region that is located to oppose and communicated with the inlet port of the conduit and an upper extending region that extends upward from the opposing region up to a higher level relative to the inlet port of the conduit; and
an upper inflatable portion that is located above the conduit and partitioned from the conduit by the upper boundary portion, the upper inflatable portion being communicated with the upper extending region of the inlet-side inflatable portion so as to be inflatable generally simultaneously with the inlet-side inflatable portion upon inflation of the primary inflatable portion and having an opening dimension in a vertical direction that is greater than that of the enlarged-diameter region
wherein the secondary inflatable portion is surrounded by the partitioning portion and the bottom area of the peripheral portion in the lower periphery of the airbag, and the secondary inflatable portion is communicated with the protection portion of the primary inflatable portion by only one of said conduit.

2. The head-protecting airbag of claim 1, wherein:
the inlet-side inflatable portion is located in an area ranging from the bottom area of the peripheral portion in the lower periphery of the airbag to a top area of the peripheral portion in an upper edge of the airbag; and
the opening dimension in a vertical direction of the enlarged-diameter region is configured in a range of ¼ to ⅙ of an opening dimension in a vertical direction of the inlet-side inflatable portion.

3. The head-protecting airbag of claim 2 wherein the opening dimension in a vertical direction of the enlarged-diameter region is 70 to 120 mm.

4. The head-protecting airbag of claim 3 wherein the opening dimension in a vertical direction of the enlarged-diameter region is 80 to 120 mm.

5. The head-protecting airbag of claim 1 wherein an opening dimension in a vertical direction of the main region of the conduit is 30 to 70 mm.

6. The head-protecting airbag of claim 5 wherein the opening dimension in a vertical direction of the main region of the conduit is 30 to 60 mm.

7. The head-protecting airbag of claim 1, wherein:
the airbag includes two of the protection portions that are located in front and at the rear of the secondary inflatable portion; and
the conduit is communicated with the inlet-side inflatable portion of either one of the protection portions and is located at a vicinity of a center of the airbag in an anteroposterior direction together with the secondary inflatable portion.

8. The head-protecting airbag of claim 7, wherein:
the two protection portions are so configured as to cover two windows of the vehicle located in front and rear of a pillar of the vehicle; and
the conduit is deployable on an inboard side of the pillar.

9. The head-protecting airbag of claim 1, wherein:
the conduit is located adjacent a central region of the bottom area of the peripheral portion in the lower periphery of the airbag.

10. The head-protecting airbag of claim 1, wherein:
the conduit is configured to have a restrained opening area in a direction orthogonal to an axial direction from the inlet port to the outlet portion.

* * * * *